B. W. KING.
SCALE.
APPLICATION FILED MAR. 13, 1911.
1,001,202.
Patented Aug. 22, 1911.
2 SHEETS—SHEET 1.
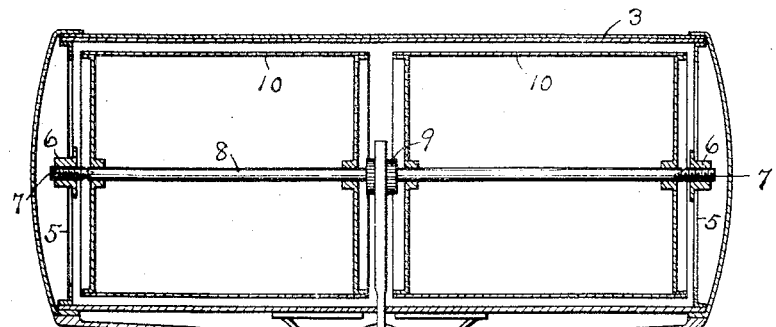
Fig. 1.
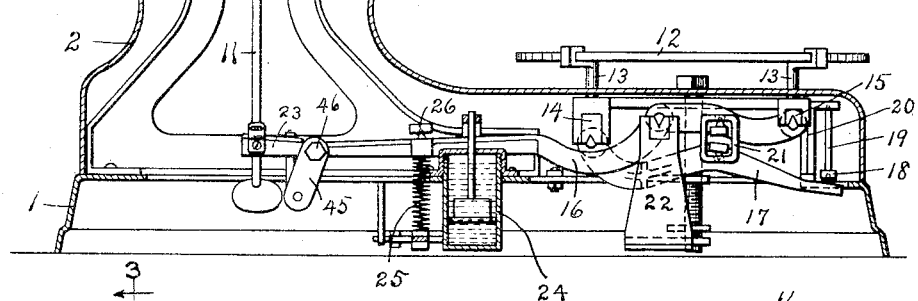
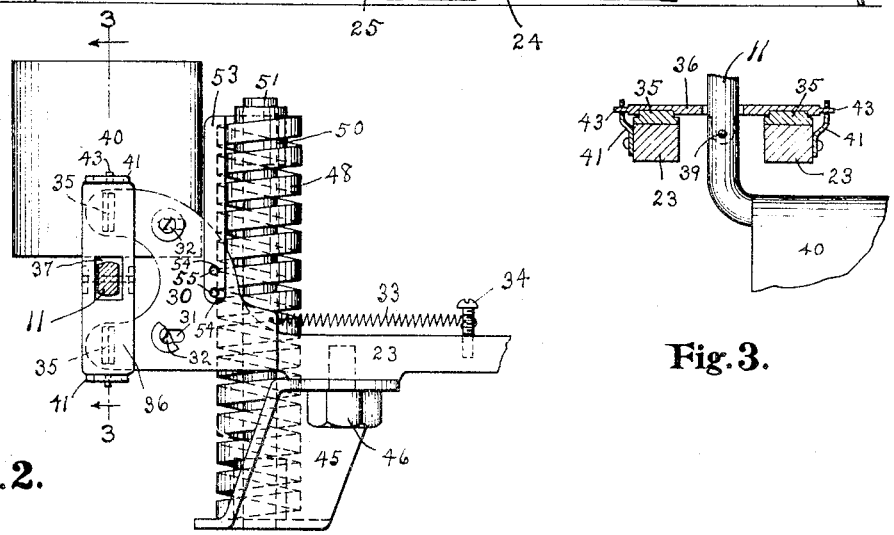
Fig. 2.
Fig. 3.
Witnesses
Albert A. Hofmann
Elizabeth W. Crown
Inventor
Bert W. King.
By Edward N. Pagelsen
Attorney

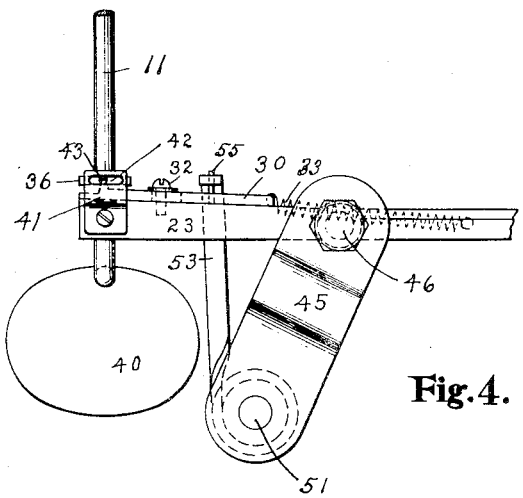
Fig. 4.
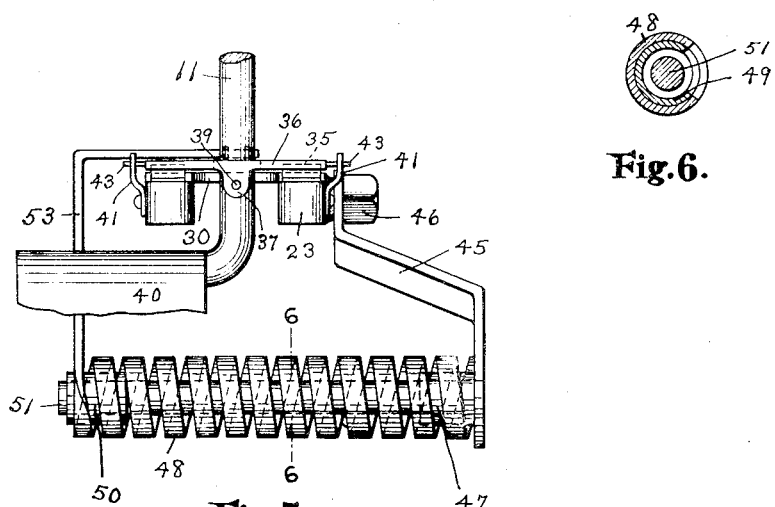
Fig. 5.
Fig. 6.

UNITED STATES PATENT OFFICE.

BERT W. KING, OF DETROIT, MICHIGAN, ASSIGNOR TO STANDARD COMPUTING SCALE COMPANY, LIMITED, OF DETROIT, MICHIGAN, A LIMITED PARTNERSHIP.

SCALE.

1,001,202.      Specification of Letters Patent.      Patented Aug. 22, 1911.

Application filed March 13, 1911. Serial No. 613,947.

*To all whom it may concern:*

Be it known that I, BERT W. KING, a citizen of the United States, and a resident of Detroit, in the county of Wayne and State of Michigan, have invented a new and useful Scale, of which the following is a specification.

This invention relates to means adapted to be connected to the weight indicating device of weighing-scales and its actuating mechanism for the purpose of compensating for the expansions and contractions resulting from changes in temperature, and its object is to provide an effective device which may be secured to one of the moving parts of computing scales, such as the main beam, whereby such compensation is effected automatically.

This invention consists in a novel thermostat adapted to be secured to a moving part of a scale, such as one end of the main lever, and so connected to the weight-indicating mechanism, that the effective movement of the weight indicator remains uniform irrespective of the temperature.

In the accompanying drawings, Figure 1 is a vertical section of a computing scale showing the levers and the rack bar of the scale in elevation. Fig. 2 is a plan of the thermostat and the adjacent mechanism on a larger scale. Fig. 3 is a section on the line 3—3 of Fig. 2. Fig. 4 is a front elevation of the mechanism shown in Fig. 2. Fig. 5 is an end elevation of the same, a portion of the counter-weight being broken away for clearness. Fig. 6 is a section on the line 6—6 of Fig. 5.

Similar reference characters refer to like parts throughout the several views.

The scale shown in the drawings is a well-known platform scale having a computing drum. Its base 1 has a case 2 mounted upon it which incloses the movable parts. A cylindrical shell 3 is supported by a frame 4 and within the shell are upright parts 5 which carry the nuts 6 in which are adjustably mounted the pivot-screws 7. These screws support the shaft 8 which carries the small pinion 9 and the indicating drums 10. A rack bar 11 extends down from this pinion.

The platform 12 is carried by the upright bars 13 which have bearings 14 and 15 at the lower ends. The bearings 15 rest on the knife-edges at the rear ends of the main lever 16, while the bearings 14 rest on knife-edges on the front ends of the secondary lever 17. The knife-edges at the rear ends of the secondary lever 17 engage a cross bar 18 having an upwardly extending rod 19, which in turn has its upper end engaging a bracket 20 extending upward from the base 1. Links 21 connect the secondary lever to the main lever which in turn is carried by the pedestals 22.

A dash-pot 24 is adapted to dampen the movements of the main lever while a spring 25 connects to a bar 26 which rests on knife-edges carried by the main lever. All the mechanism thus far described is well known as before stated and may be replaced by any other desired form of scale.

In even-balance scales the parts expand evenly so that no provision need be made for such expansion as the proportions between them remains the same.

In computing scales of the drum type, springs are employed to resist the loads in place of the usual poises or weights and the metal from which the springs are made stretches farther under the same load in higher than in lower temperatures. In a scale of the type shown in the drawings the tendency is for the rack bar 11 to move farther during higher temperatures than during lower under equal loads on the platform because the spring expands farther under such conditions. To obviate this difficulty it is necessary to change the connection between the spring and rack bar, which may be done by shortening the long arm 23 of the main lever, between the pedestal 22 and the rack bar 11, in proportion to the increase of the coefficient of expansibility of the spring. For this purpose the inner end 23 of the main lever is bifurcated and inclined. Slidably mounted on this lever is a plate 30 provided with small slots 31 through which the screws 32 extend, which screws permit longitudinal movement of the plate on the end 23 of the lever. A small spring 33 connects to this plate and to a pin 34, and tends to hold the plate in its rearward position. Formed on this plate are knife-edges 35 on which rests a cross bar 36 provided with an aperture 37 through which the lower end of the rack bar 11 extends. This plate 36 has lugs 38 which carry the pin 39 which extends through this rack bar. As will be seen in the drawings, this rack bar is bent at its lower end and carries a weight 40 which tends to hold the toothed upper end of the rack bar against the pinion 9 on the shaft 8. Small plates 41 are secured to the sides of the bifurcated ends of the main lever 16 and have slots 42 through which the guide pins 43 on the small cross bar 36 extend. By this construction the plate 30, its knife-edges, the cross bar 36 and the lower end of the rack bar 11 can be moved toward and from the pedestal 22 and still remain in proper alinement. For the purpose of moving this plate 30 toward and from the pedestal 22 along the top of the main lever the thermostat shown in Figs. 2, 4, 5 and 6 may be employed. A plate 45 is secured to the inner end 23 of the main lever by means of the screw 46 and carries a collar 47 on which is secured the helix formed by winding together two strips of dissimilar metal. I prefer an outer strip 48 of brass and an inner strip 49 of steel, which two strips may be electrically welded, brazed, soldered or otherwise secured together. If desired, a short sleeve 50 may be secured within the free end of this helix so as to furnish a bearing for this outer end on the shaft 51 which is carried by the sleeve 47. An arm 53 extends upward and then inward, as shown in the drawings, which arm may be formed from the brass strip 48, or be secured in any desired manner to the free end of the helix. This arm may be formed with two small holes 54 through which extends the pins 55 carried by the plate 30. These holes should be sufficiently large to permit angular movement of this arm 53, and because of the spring 33 the pins will always bear against one side of these holes only. A thermostat of this type will tend to unwind with decreasing temperatures and to wind with increasing temperatures owing to the larger co-efficient of expansion of the brass. As a result, the plate 30 and its knife-edges will be moved toward the pedestal 22 with increasing temperatures so that this arm of the main lever will be shortened in proportion to the expansion of the spring 25.

Where the frame supporting the indicating drum is made of cast iron and the rack bar 11 is of brass, the greater expansion of the rack bar must be compensated. This may be done by forming the end 23 of the main lever inclined so that the lower end of the rack bar will be lowered relatively to the line of the main lever with increasing temperatures and elevated with decreasing temperatures. Another function of this inclined surface of the end 23 is to compensate for the varying initial expansion of the spring 25. It is desirable to tension the spring to counterbalance the weight of the platform and levers. The expansion of the spring because of this load is greater with higher than with lower temperatures. So with higher temperatures it is desirable to lower the rack bar 11 which is accomplished by moving the plate 30 down the incline on the end 23. While the drawings show the moving part of the scale to which this thermostat is connected to be the forward end of the main lever, it will be evident that this compensating device may be employed in many other positions. Its chief function is to compensate the difference in expansion of the main spring caused by changes of temperature, and thereby insure the rack bar moving equal distances at all times for similar loads on the platform.

Having now explained my construction, what I claim as my invention and desire to secure by Letters Patent is:

1. In a scale, the combination of a main lever, a load receiver connected thereto, a weight indicating drum, a rack-bar to actuate the same, a spring connected to the lever to resist the load, a connection between the rack-bar and lever independent of the spring connection, and adjusting means to vary the connection between the rack bar and lever according to changes in temperature to compensate for the variation in the coefficient of expansion of the spring.

2. In a scale, the combination of a main lever, a load receiver connected thereto, a weight indicator, a rod to operate the same, a weight resisting spring, a connection between the spring and the lever independent of the connection to the indicator and a thermostat controlling the connection between the lever and the rod to vary the operative lever arm inversely with the temperature.

3. In a scale, the combination of a base, a scale lever mounted thereon, a load receiver connected to one arm of said lever, a spring connected to the other arm, said latter arm having the upper surface of the outer end inclined inwardly, a plate mounted on said inclined surface, a bar mounted on said plate, a weight indicator actuated by said bar, and a thermostat mounted on said arm and connected to said plate to move the plate inwardly or outwardly as the temperature increases or decreases.

4. In a scale, the combination of a load receiver, a movable part connected thereto, a spring tensioned thereby, a weight indicator, and a thermostat controlling the connection between the weight indicator and said movable part independent of the connection between the spring and the movable part.

5. In a scale, the combination of a base, a scale lever mounted thereon, a load receiver connected to said lever, a spring to resist the load, a plate mounted on one end of said beam and having pivots on its upper surface, a rod carried by said pivots, a weight indicator connected to said rod, and a thermostat for controlling the position of said plate on the lever.

6. In a scale, the combination of a base, a scale lever mounted thereon, a load receiver connected to one arm of said lever, a spring connected to the other arm, said latter arm having the upper surface of the outer end inclined inwardly, a plate mounted on said inclined surface, a spring to normally draw the plate inwardly, a bar mounted on said plate, a weight indicator actuated by said bar, and a thermostat mounted on said arm and connected to said plate to move the plate outwardly or permit it to move inwardly as the temperature decreases or increases.

7. In a scale, the combination of a base, a scale lever mounted thereon, a load receiver connected to said lever, a spring to resist the load, a plate mounted on one end of said beam and having pivots on its upper surface, a rod carried by said pivots, a weight indicator connected to said rod, and a thermostat for controlling the position of said plate on the lever, the said end of the beam being inclined so that the rod will be lowered as it moves inwardly and elevated as it moves outwardly.

8. In a scale, the combination of a load carrying lever, a yieldable device for resisting the action of the load on the lever, an indicator, means to connect the same to the lever independently of the resisting device, and means for adjusting such connection so as to vary the relation of movement of the indicator and the load resisting device.

In testimony whereof I have signed this specification in the presence of two subscribing witnesses.

BERT W. KING.

Witnesses:
LOUIS JAENICHEN,
GEORGE E. RENTON.